United States Patent [19]
Pashley et al.

[11] Patent Number: 5,978,833
[45] Date of Patent: *Nov. 2, 1999

[54] METHOD AND APPARATUS FOR ACCESSING AND DOWNLOADING INFORMATION FROM THE INTERNET

[75] Inventors: Richard D. Pashley; Bruce McCormick, both of Roseville, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,253

[22] Filed: Dec. 31, 1996

[51] Int. Cl.⁶ .................................................. G06F 17/30
[52] U.S. Cl. .......................................... 709/200; 709/231
[58] Field of Search .................................... 711/117, 112; 345/132; 455/435; 395/200.36, 701, 500, 200.03, 200.09, 615, 616, 702; 382/229; 707/104, 513

[56] References Cited

U.S. PATENT DOCUMENTS

| | | | |
|---|---|---|---|
| 5,012,407 | 4/1991 | Finn | 711/117 |
| 5,430,861 | 7/1995 | Finn | 711/112 |
| 5,519,706 | 5/1996 | Bantz et al. | 455/435 |
| 5,530,852 | 6/1996 | Maseke | 395/200.36 |
| 5,644,657 | 7/1997 | Capps et al. | 382/229 |
| 5,737,599 | 4/1998 | Rowe et al. | 707/104 |
| 5,754,858 | 5/1998 | Broman et al. | 395/701 |
| 5,761,485 | 6/1998 | Munyan | 395/500 |
| 5,781,785 | 7/1998 | Rowe et al. | 707/513 |

*Primary Examiner*—Ahmad F. Matar
*Assistant Examiner*—Khanh Quang Dinh
*Attorney, Agent, or Firm*—Calvin E. Wells

[57] ABSTRACT

A method and apparatus for accessing and downloading information from the internet to a hand held computer system. The computer system includes a bus to which a processor, a display screen, input keys, and a flash memory are coupled. The flash memory stores an operating system for the computer system, search criteria, information corresponding to the search criteria downloaded from the internet, and display application software for displaying the information on the display screen.

19 Claims, 3 Drawing Sheets

METHOD AND APPARATUS FOR ACCESSING AND DOWNLOADING INFORMATION FROM THE INTERNET

FIELD OF THE INVENTION

The present invention relates to mobile computer systems and more particularly to a method and apparatus for accessing and downloading information from the internet to a mobile computer system.

BACKGROUND OF THE INVENTION

The internet has become a pervasive medium through which both commercial and personal users can communicate information targeted at a particular audience. An internet user has the ability to access a vast amount of information that is of interest to that user. For example, a user having an interest in the stock price of a particular company can access any of a multitude of pages available on the World Wide Web that provides stock price information to the user. A user interested in the final score and highlights of a particular sporting event can access a site on the internet that contains sports scores and highlights of the desired game.

Access to the internet for the purpose of retrieving or sending information is typically done using a desktop computer. Accessing internet information using a desktop computer is inefficient because it makes the desired information available to the user only at a relatively permanent, central location. A user cannot readily take their desktop computer with them during travel.

The use of traditional mobile computer systems, such as, for example, laptop and notebook computers, improves the portability of the internet access device, while maintaining a significant portion of the speed and features provided by desktop computer system. Internet access via a traditional mobile computer while the user is in transit, however, can be awkward and unreliable. The wireless modem communication required to transfer Internet information to a mobile computer is currently both slow and unreliable, and, in addition, traditional mobile computers can be heavy, fragile, and inconvenient for use in a transit situation.

SUMMARY OF THE INVENTION

One desire of the present invention is to provide a means for accessing information on the internet.

Another desire of the present invention is to view information downloaded from the internet in a mobile form factor.

A method and apparatus for accessing and downloading information from the internet to a hand held computer system is described. The computer system includes a bus to which a processor, a display screen, input keys, and a flash memory are coupled. The flash memory stores an operating system for the computer system, search criteria, information corresponding to the search criteria downloaded from the internet, and display application software for displaying the information on the display screen.

Other desires, features, and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus for accessing and downloading information from the internet to a hand held computer system is described in which a hand held computer system, using flash memory storage, searches and downloads information from the internet to the flash memory for subsequent display of the information via an on board display screen. The flash memory of the hand held computer system stores the operating system, search application software, display application software, and search criteria. The hand held computer system includes a phone jack through which the internet is accessed via a modem.

A user enters search criteria into the hand held computer system, which is stored in the flash memory. When the hand held computer system is provided with access to the internet, the storage search application software is executed and uses the stored search criteria to search the internet for information corresponding to the search criteria. When such information is located, it is downloaded from the corresponding internet site to the hand held computer system and subsequently stored in the flash memory. Later, when the user desires to view the stored information corresponding to the search criteria, the display application software stored in the flash memory is executed by the hand held computer system, and the desired information stored in the flash memory is displayed on the display screen of the hand held computer system.

Thus, the hand held computer system can search the internet and download information overnight, and the user then uses the system to display the stored information on the display screen while, for example, in transit between the user's home and office during the morning commute. Various configuration and implementations in accordance with alternate embodiments of the present invention are described in more detail below.

Figure 1:
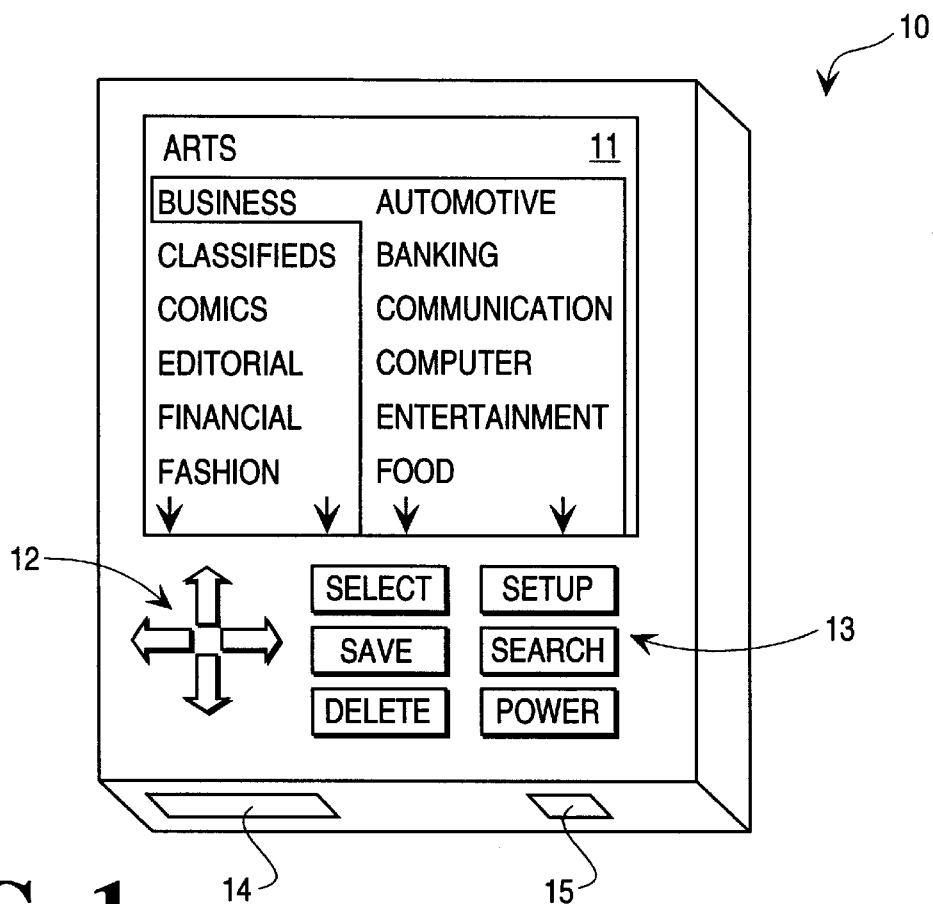
FIG. 1 is a hand held computer system formed in accordance with one embodiment of the present invention.

FIG. 1 is a hand held computer system 10 that has been designed in accordance with one embodiment of the present invention. The computer system includes a display screen 11, user input keys including cursor movement controller 12, and function keys 13, data storage interface 14, and external phone jack 15.

For one embodiment of the present invention, computer system 10 provides the user with a menu on display screen 11, from which the user selects, via cursor movement controller 12 and the select key of function keys 13, the desired category of information. The computer system tabulates the information stored in its flash memory, into a table of topics, as shown on display screen 11 of FIG. 1, to facilitate topic selection in much the same way that the index of a newspaper provides a user with a means for quickly locating desired information. For example, as shown in FIG. 1, a particular alphabetical listing of primary topics stored in the flash memory of hand held computer system 10 is listed down the left-hand side of the display screen. Using cursor control input keys 12, a user highlights a primary topic in the left-hand column, at which point various subtopics appear in the right-hand column. Again, using the input keys, the user selects the desired subtopic of the selected topic. For example, to display information related to the communication business, cursor movement controller input keys 12 are used to first highlight the primary topic of business, then to scroll down and highlight the subtopic "computer." Note that the double arrows at the bottom of the two columns of display screen 11, indicate that additional topics and subtopics are scrollable beyond the window of the display screen.

Once the proper topic and, if applicable, subtopic has been highlighted by the user using cursor movement controller 12, the user presses the "select" key of user input function keys 13 to display the information corresponding to the highlighted topic. If the displayed information is of no interest to the user, the user may press the "delete" key of input keys 13, to delete the undesired information. If instead, the user desires to save the information to an external memory device, data storage interface 14 is provided for insertion of a PC card containing flash memory. Once a PC card is inserted into the data storage interface port 14, the user presses the "save" key of user input function keys 13 to initiate downloading of the desired information to the flash memory of the PC card.

The purpose for the "setup" key of user input function keys 13 is to cause hand held computer system 10 to enter a setup mode whereby the user has the ability to personalize the operation of the computer system by, for example, determining search criteria, display screen brightness, selecting internal or external modem operation, and determining which topics are displayed on the display screen. The "search" key is provided to initiate a search of the internet once a phone line has been coupled to external phone jack 15. This is accomplished by, for example, calling a predefined telephone number of an internet access provider. A "power" button is also provided for turning the battery-operated hand held computer system on and off.

In accordance of one embodiment of the present invention, hand held computer system 10 is approximately five inches wide, seven inches high, and one inch deep. The screen of the computer system is approximately four inches wide and five inches high. For alternate embodiments of the present invention, the dimensions of the computer system are selected to provide maximum display area in a minimum form factor for portability.

For an alternate embodiment of the present invention, the screen of the hand held computer system is touch sensitive, so that cursor movement control and function key selection is done directly from the display screen itself, thereby eliminating the need to reserve space on the hand held device, for cursor movement control and function user input keys. For another embodiment, the computer system also does handwriting recognition from the display screen, enabling user entry via a stylus. For another embodiment, cursor movement control is accomplished using a fixed trackball or joystick.

For one embodiment of the present invention, in addition to downloading desired information from the internet to internal flash memory, the hand held computer system also downloads a user's electronic mail messages. Unfortunately, for the embodiment shown in FIG. 1, the user input keys provided, do not easily facilitate responding to email messages. In addition, the limited number of input keys provided in the embodiment of FIG. 1 do not facilitate the entry of highly complex user-defined search criteria. Therefore, for an alternate embodiment of the present invention, additional or alternately defined input keys are provided for the convenience of the user.

Figure 2:
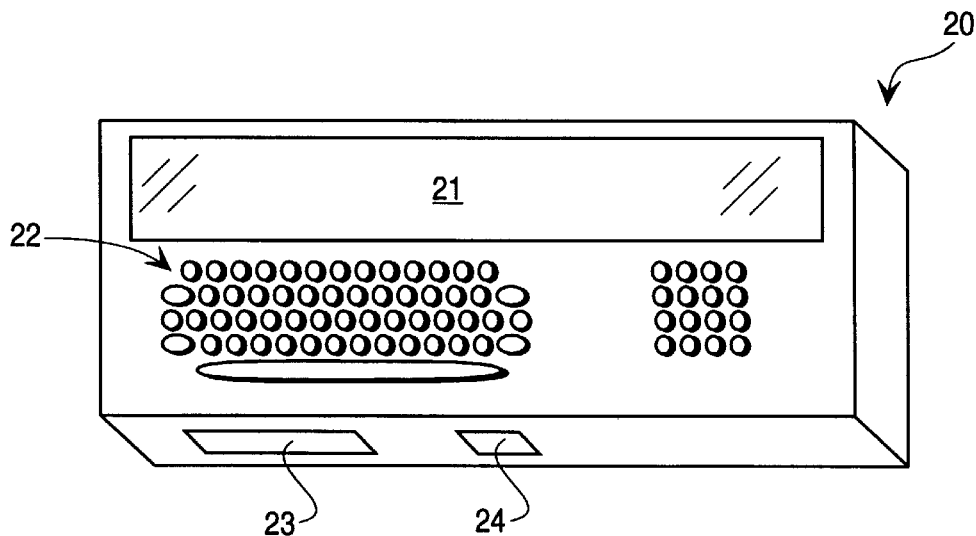
FIG. 2 is a hand held computer system formed in accordance with another embodiment of the present invention.

FIG. 2 shows such an embodiment in which a hand held computer system has been designed to provide greater flexibility with respect to the input of information by a user. Hand held computer system 20 includes display screen 21, an expanded set of user input keys 22, a data storage interface 23, and external phone jack 24. With hand held computer system 20, the user can not only download and view email but also can write email messages via user input keys 22, including a full alpha-numeric key pad.

In addition to being able to type in email messages via user input keys 22, for one embodiment of the present invention, a user has the ability to specifically tailor their internet search criteria, using input keys 22, to limit their fields of search to more specific areas of information. For example, while a user of the hand held computer system of FIG. 1 may be limited to selecting between downloading all business news related to the automotive industry or none at all, a user of the computer system of FIG. 2 can specifically enter, via input keys 22, that only automotive business related to electric vehicles from Germany is to be downloaded and stored in the internal flash memory of the computer system (see below for an example of such a query).

Using the computer systems described above, a user can effectively design their own "morning paper" by entering the appropriate search criteria into to the computer system and providing the computer system with internet access, overnight. Then, while the user is asleep, the computer system downloads information from the Internet that corresponds to the search criteria, and stores the information in its internal flash memory. In the morning the user accesses the stored information, viewing it via the display screen, thereby receiving up-to-date information without the use of a newspaper.

Figure 3:
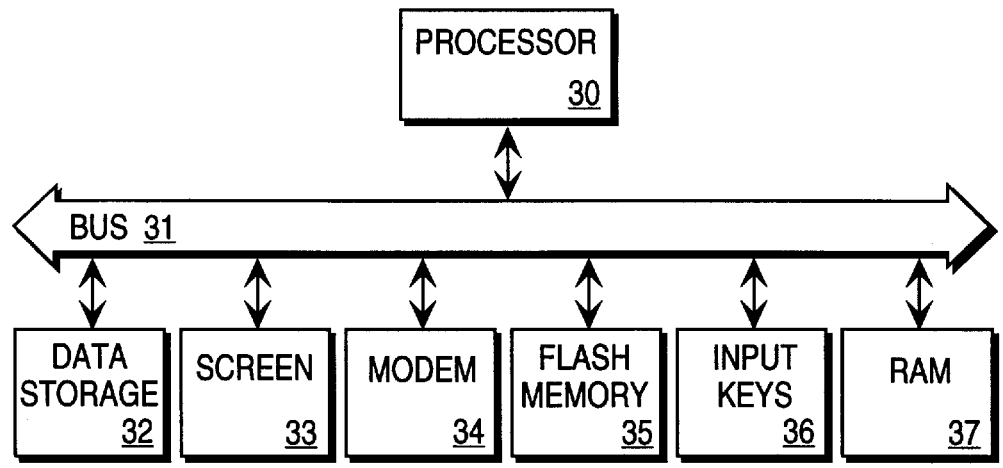
FIG. 3 is a block diagram of a computer system formed in accordance with one embodiment the present invention.

FIG. 3 is a block diagram of a computer system formed in accordance with embodiment of the present invention, in which, processor 30 is coupled to bus 31 of the computer system. A bus is a means by which various components of the computer system communicate with each other. Bus 31 of FIG. 3 comprises any of a number of standard, proprietary buses and bus protocols coupled by bridges or other coupling devices. Also, coupled to bus 31 is data storage 32, screen 33, modem 34, flash memory 35, input keys 36, and random access memory (RAM) 37.

Processor 30 is used to execute instructions stored in flash memory 35 or RAM 37. For one embodiment of the present invention, processor 30 comprises a relatively cheap, older generation processor, such as, for example, a 386 or 486 processor. For one embodiment of the present invention, the processor is incorporated into an embedded controller or a micro-processing device. Processor 30 need not be an expensive, high powered processor because, in accordance with an embodiment of the present invention, the most processing-intensive application of the computer system occurs during a search of the internet during a period of time in which the user is not actively awaiting the results of the search (such as, for example, overnight, while the user is asleep). Because the user is not actively awaiting results of the search, searching for and downloading the desired information can proceed relatively slowly, allowing a less expensive processor to be implemented, thereby reducing the cost of the overall computer system.

In accordance with one embodiment of the present invention, there is no disk, either floppy or hard drive, coupled to bus 31 or otherwise incorporated into the computer system. Instead, flash memory 35 is used to store any and all data requiring non-volatile permanency. Ensuring that the computer system is entirely solid-state in this manner, improves the reliability and reduces the cost of the system.

For one embodiment of the present invention, data storage 32 coupled to bus 31 is optional, and may include, for example, a removable PC card that a user can insert into a data storage interface slot of the computer system. Data storage 32 is used to externally store information from internal flash memory 35 or RAM 37, for the purpose of either backing up the information or allowing the information to be transferred to another computer system having a compatible data storage interface. This embodiment may be found useful for applications in which, for example, information downloaded from the internet and stored in the flash memory is to be incorporated into a report or presentation being prepared on a larger desktop or mobile computer system.

Screen 33 is coupled to bus 31 and is used to display the information stored in flash memory 35. While information is being displayed on screen 33, screen image information is stored in RAM 37. Using RAM 37 to store this information rather than flash memory 35 improves the speed with which screen 33 is updated, because data stored in RAM 37 can be more quickly updated than can data stored in flash memory 35.

For the embodiment of the present invention shown in FIG. 3, the computer system includes modem 34 coupled to bus 31, and is an internal modem of the computer system. For an alternate embodiment of the present invention, only a modem interface is coupled to the bus of the computer system. This modem interface communicates with an external modem used to couple a phone line to the computer system. For one embodiment of the present invention, the modem used to couple the computer system to a an internet access provider, via a phone line, operates at 19.2 Kbs. For alternate embodiments of the present invention, slower modems may be used to reduce the cost of the overall computer system, or faster modems may be used to improve the performance of the system. In general, however, the reduced performance provided by slower modems will not likely have a great impact of the function of the computer system because, as described above with respect to processor selection, a user will not perceive the slow execution speed of searching for and downloading information, because this is done during a period of time when the user is not directly interacting with the computer system.

For one embodiment of the present invention, flash memory 35, which is coupled to bus 31, includes approximately 8 to 16 Mb of internal flash memory storage capacity. For an alternate embodiment of the present invention, flash memory 35, includes as little as 2 Mb of storage capacity. For other embodiments of the present invention, the flash memory storage capacity of the computer system increases with increased flash memory storage density and decreased cost per bit of flash storage. As will become evident from the discussion below with respect to FIG. 4, determination of the proper memory storage capacity of flash memory 35 involves balancing the cost of the flash memory, the size of the actual flash memory devices, and the information storage capacity, operating system size, display application software size, and other data which must be stored in the flash memory.

Flash memory 35 is used to store the information downloaded from an internet site corresponding to a predefined search criteria that the user has entered. Although the speed with which information can be stored in a flash memory device is relatively slow with respect to, for example, data stored in RAM, the delay in storage speed is imperceptible to a user because, as described above with respect to the selection of the processor and modem, searching and downloading information from the internet to the computer system is automatically done during a period of time in which the user is not directly interacting with the computer system. In accordance with an embodiment of the present invention, as information is downloaded from the internet via a phone line and through modem 34 to bus 31, the information is temporarily buffered in RAM 37 before being transferred into flash memory 35. For an alternate embodiment of the present invention, modem 34 buffers the data, placing it in a format which can be quickly stored in flash 35.

Input keys 36 coupled to bus 31 includes user input function keys and user input cursor movement controllers, such as, for example, an alphanumeric keypad, arrow keys, mouse, trackball, or joystick. For an alternate embodiment of the present invention in which the screen of the computer system is touch sensitive, some or all of the input is done via the screen itself.

For one embodiment of the present invention, RAM 37 coupled to bus 31 includes dynamic RAM devices. For an alternate embodiment of the present invention, static RAM or video RAM may also be implemented.

Figure 4:
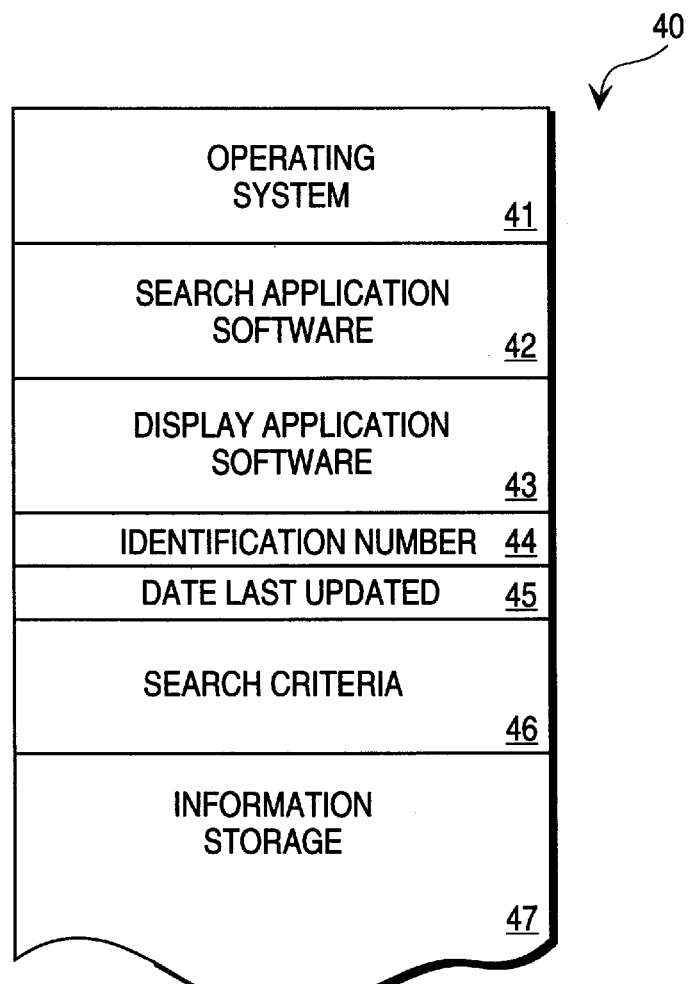
FIG. 4 is information stored in a flash memory in accordance with an embodiment of the present invention.

FIG. 4 depicts the storage of information in the flash memory of a computer system designed in accordance with an embodiment of the present invention. An operating system 41 is stored in an address space of flash memory 40. Operating system 41 contains the instructions and other information that the computer system needs to implement the functions described above. For one embodiment of the present invention, all or a portion of operating system 41 is downloaded to the RAM of the computer system upon turning on the computer system. For another embodiment, the operating system remains in the internal flash memory and the processor runs the operating system directly from the flash memory.

Search application software is stored in address space 42 of flash memory 40. For one embodiment of the present invention, this search application software contains all the instructions and data needed such that, when the processor executes this search application, the computer system searches the internet for the desired information. For example, an intelligent browser is included in the search application software address space. For another embodiment of the present invention, the search application software works in conjunction with search application software residing on a server at an internet site to implement searching for and downloading of the desired information. For example, bookmark definitions may be all that is included in the search application software address space. These bookmarks are used in conjunction with an internet-based search program to download the desired information from the bookmarked internet sites. For another embodiment of the present invention, there is no search application software stored in the flash memory of the computer system. For this embodiment, all search application instructions and data reside on-line and the computer system executes the search application when the computer system accesses the appropriate internet site.

Display application software is stored in address space 43 of flash memory 40. This display application software includes the instructions and data that, when executed by the processor of the computer system, causes the information to be displayed on a display screen. For example, for one embodiment of the present invention, the display application software includes routines that provide for highlighting successive topics of information stored in the flash memory of the computer system in response to a user input of cursor movement commands. For another embodiment of the present invention, the display application software includes one or more decompression routines for decompressing information stored in the flash memory of the computer system, preparing the information for display on the display screen of the computer system.

An identification number is stored in address space 44 of flash memory 40. This identification number is permanently stored in flash memory 40 and uniquely identifies the particular hand held computer system. For one embodiment of the present invention, the identification number is transmitted to a database residing at an internet site to access predefined variables corresponding to the particular hand held computer system. These variables are then used to tailor the execution of a software application. For example, a user may enter specific search criteria for an internet search and store that criteria in an on-line database along with the users identification number. A hand held computer system designed in accordance with the present invention then accesses this database, transmits the identification number, and the search criteria corresponding to the identification number is then provided and used in conjunction with search application software (residing either on-line or in the hand held computer system) to search for the appropriate information. For another embodiment of the present invention, the identification number is used for billing purposes, to charge the user of the hand held computer system each time a search is executed.

In accordance with one embodiment of the present invention, the date representing the date at which the hand held computer system was last updated is stored in address space 45 of flash memory 40. For one embodiment of the present invention, this date may be found useful for application in which a previously searched internet site has not been updated since the site was last searched. By comparing the date that the site was last updated to the date that the information stored in the flash memory was last updated, a time consuming, redundant search of the sight may be avoided.

Search criteria is stored in address space 46 of flash memory 40. This search criteria is defined by the user of the hand held computer system and contains key words along with boolean expressions. For example, if a user desires all information related to the German electric vehicle industry, the search criteria will include the expression : (GERMAN) and [(ELECTRIC VEHICLE) or (ELECTRIC CAR) or (ELECTRIC AUTO)]. For another embodiment of the present invention, the flash memory of the computer system does not contain search criteria, and instead the search criteria is stored in a database, at an internet site along with the corresponding unique hand held computer system identification number for access by the hand held computer system during an internet search, as described above.

Information corresponding to the search criteria from corresponding internet sites is stored in address space 47 of flash memory 40. For one embodiment of the present invention, only text information is stored in the information storage address space. For another embodiment of the present invention, both text and graphical information is stored. The text or graphic information may be stored as compressed or uncompressed data.

Figure 5:
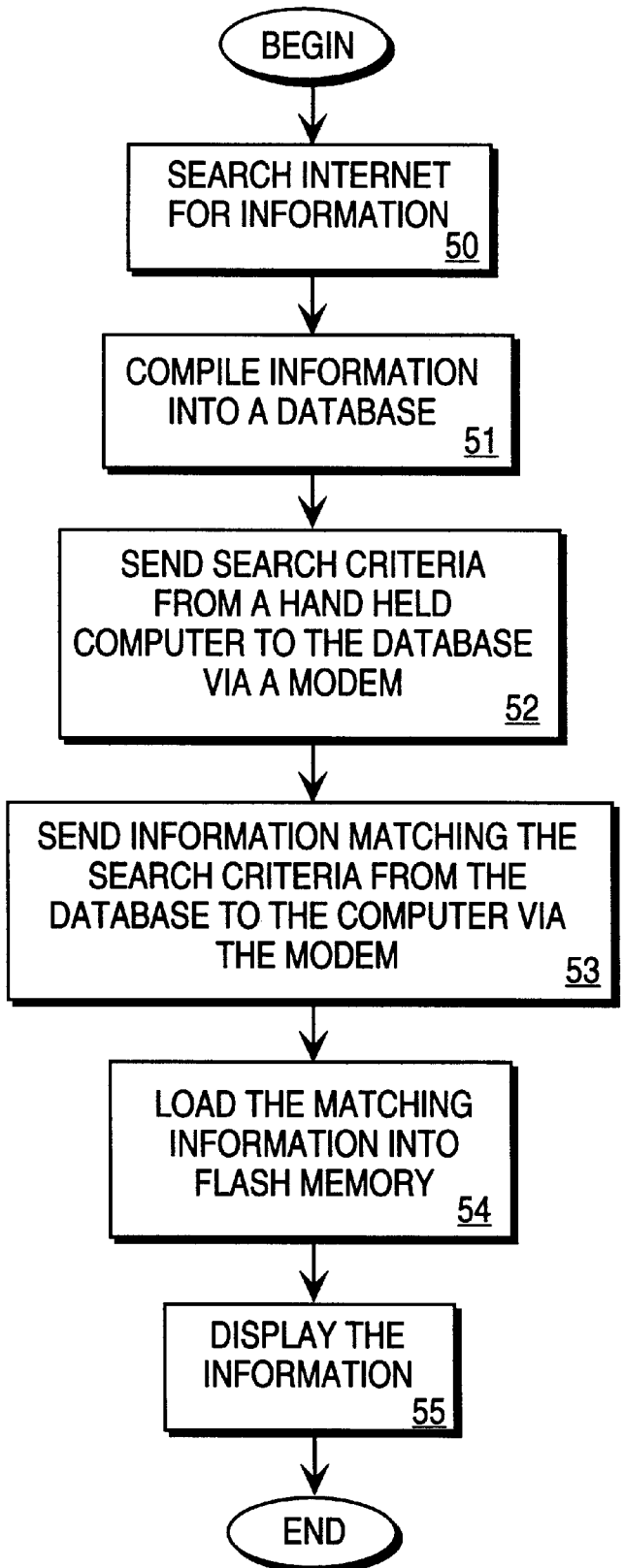
FIG. 5 is a flow chart of a method of an embodiment of the present invention.

FIG. 5 is a flowchart of an embodiment of the present invention in which the hand held computer system operates in conjunction with an on-line database to search the internet for information corresponding to the user-defined search criteria. First, the internet is searched for a predefined set of information corresponding to a broad predefined search criteria, at step 50. This broad search criteria may be defined by the hand held computer system user or by a facilitator. The results of the search at step 50 are filtered, compiled, and, for one embodiment, are placed in a presentable format by the facilitator and stored in a database at step 51.

Referring back to FIG. 1, information corresponding to all of the possible categories of information that a user has an opportunity to select, using hand held computer system 10, is stored in the database at step 51 of FIG. 5. For example, all arts, business, classifieds, comics, editorial, etc., information is pre-searched and pre-categorized into topics and subtopics, and is stored in the database at step 51.

Next, at step 52 the hand held computer system sends its user-defined search criteria to the on-line database via a modem. At step 53, the database then sends information matching the user-defined search criteria back to the hand held computer system. At step 54, this information is then loaded into flash memory in the hand held computer system. At step 55, the information is displayed on the display screen on the hand held computer system in response to user selections of the corresponding topics and subtopics.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automatically gathering information from a computer network onto a hand held computer system comprising the steps of:

defining a search criteria, the search criteria including one or more topics;

storing the search criteria in a flash memory of the hand held computer system;

providing the hand held computer system with access to the computer network through a phone line and modem;

signaling a processor in the hand held computer to execute search application software, the search application software being stored in the flash memory;

automatically searching the computer network for information corresponding to the search criteria, the search being performed during a period of time when there is no interaction between the computer system and a user;

automatically downloading the information corresponding to the search criteria from the computer network into the flash memory of the hand held computer; the downloading being performed during a period of time when there is no interaction between the computer system and a user;

displaying portions of information on a display screen of the hand held computer system in response to user input commands at a time when the user desires to view the stored information corresponding to the search criteria.

2. The method of claim 1 further comprising the step of tabulating the information stored in flash memory into a table of topics to facilitate topic selection by the user.

3. The method of claim 1 further comprising the step of storing a date in the flash memory of the hand held computer system which represents the date on which the hand held computer system was last updated, wherein a date on a computer network site which is being searched, which corresponds to the date the site was last updated, is compared to the date in the hand held computer, and the information at the site is disregarded if it has not been updated since the site was last searched.

4. The method of claim 1 further including the steps of:
storing the search criteria in an on-line database of the computer network;
defining a hand held computer identification number;
transmitting the identification number to the on-line database and storing it in the on-line database in association with the search criteria;
wherein the step of automatically searching the computer network further comprises transmitting the identification number of the hand held computer to the on-line database and accessing the stored search criteria to carry out the search.

5. A method of automatically gathering information from a computer network onto a hand held computer system comprising the steps of:
defining broad search criteria corresponding to one or more topics;
storing the broad search criteria in a flash memory of the hand held computer system;
signaling a processor in the hand held computer to execute search application software, the search application software being stored in the flash memory;
automatically searching the computer network for information corresponding to the broad search criteria;
automatically categorizing the information corresponding to the results of the search according to the one or more topics and storing the information in an on-line database located on the computer network;
wherein the search and the categorization are performed during a period of time when there is no interaction between the computer system and a user;
storing user-defined search criteria in the flash memory of the hand held computer system;
automatically accessing the on-line database of the computer network and filtering the stored information using the user-defined search criteria;
automatically downloading the filtered information corresponding to the user-defined search criteria from the computer network into the flash memory of the hand held computer;
wherein the filtering and downloading are performed during a period of time when there is no interaction between the computer system and a user;
displaying portions of the filtered information on a display screen of the hand held computer system in response to user input commands at a time when the user desires to view the stored information corresponding to the search criteria.

6. The method of claim 5 further comprising the step of tabulating the filtered information stored in flash memory into a table of topics to facilitate topic selection by the user.

7. The method of claim 5 further comprising the step of storing a date in the flash memory of the hand held computer system which represents the date on which the hand held computer system was last updated, wherein a date on a computer network site which is being searched, which corresponds to the date the site was last updated, is compared to the date in the hand held computer, and the information at the site is disregarded if it has not been updated since the site was last searched.

8. A hand held computer system comprising:
a bus;
a processor coupled to the bus;
a display screen coupled to the bus;
a modem coupled to the bus and to a phone jack which allows the computer system to communicate with a computer network; and
flash memory coupled to the bus for storing all data requiring non-volatile permanency, the flash memory having stored therein;
an operating system having instructions;
search criteria corresponding to one or more topics;
search application software that, responsive to the operating systems instructions, automatically searches and downloads information corresponding to the search criteria from the computer network into the flash memory during a period of time when there is no interaction between the computer system and a user; and
display application software that, when executed by the processor, causes the information to be displayed on the display screen.

9. The computer system of claim 8, wherein the modem is an internal modem.

10. The computer system of claim 8, wherein the modem is an external modem that is coupled to the bus through a modem interface.

11. The computer system of claim 8, further comprising data storage coupled to the bus, the data storage having a data storage interface slot for receiving a removable PC card for externally storing the downloaded information in the flash memory.

12. The computer system of claim 8, wherein the flash memory further has stored therein a date, the date representing the date at which the information stored in the flash memory was last updated.

13. The computer system of claim 8, wherein the flash memory further has stored therein a unique identification number.

14. The computer system of claim 8, further comprising a plurality of user input keys coupled to the bus.

15. The computer system of claim 14, wherein the user input keys includes a search key for initiating the search application software to execute an automatic search and download of information from the computer network corresponding to the search criteria.

16. The computer system of claim 11, further comprising a save key than initiates transferring of at least a portion of the information which was downloaded from the computer network into the flash memory, from the flash memory to the removable PC card for externally storing the information from the internal flash memory.

17. The computer system of claim 14, wherein the user input keys include a full alpha-numeric key pad.

18. The computer system of claim 8, wherein the display screen is touch sensitive.

19. The computer system of claim 8, wherein the processor is an embedded controller.

* * * * *

UNITED STATES PATENT AND TRADEMARK OFFICE
CERTIFICATE OF CORRECTION

PATENT NO. : 5,978,833
DATED : November 2, 1999
INVENTOR(S) : Richard D. Pashley, et. al.

It is certified that error appears in the above-identified patent and that said Letters Patent is hereby corrected as shown below:

| COLUMN | LINES(S) | |
|---|---|---|
| 07 | 45 | Delete "sight" and substitute --site--. |
| 08 | 38 | Delete "the steps of". |
| 08 | 44,45 | Delete "phone line and modem" and insert --communication interface--. |
| 10 | 10 | Delete "modem coupled to the bus and to a phone jack" and insert --communication interface--. |
| 10 | 28 | Delete "modem" and insert --communication interface--. |
| 10 | 30 | Delete "modem" and insert --communication interface--. |

Signed and Sealed this

Twenty-fifth Day of July, 2000

Attest:

*Attesting Officer*

Q. TODD DICKINSON
*Director of Patents and Trademarks*